(12) United States Patent
Knepper

(10) Patent No.: US 7,518,613 B2
(45) Date of Patent: Apr. 14, 2009

(54) SYSTEM AND METHOD FOR INFORMATION HANDLING SYSTEM EXTERNAL GRAPHICS BOX LOCAL DIAGNOSTIC MESSAGE

(75) Inventor: Lawrence E. Knepper, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 505 days.

(21) Appl. No.: 11/330,918

(22) Filed: Jan. 11, 2006

(65) Prior Publication Data

US 2007/0159489 A1     Jul. 12, 2007

(51) Int. Cl.
G06F 15/00 (2006.01)
G06T 1/00 (2006.01)
G06F 13/14 (2006.01)
G06F 13/00 (2006.01)

(52) U.S. Cl. .................. 345/501; 345/520; 710/109
(58) Field of Classification Search ............. 345/520, 345/501; 710/109
See application file for complete search history.

(56) References Cited

U.S. PATENT DOCUMENTS 5,922,054 A * 7/1999 Bibayan ............... 719/328
6,826,713 B1 * 11/2004 Beesley et al. ............ 714/25
6,873,331 B2 * 3/2005 Emmot et al. ............ 345/503
7,028,228 B1 * 4/2006 Lovy et al. ................ 714/57
7,047,533 B2 * 5/2006 Circenis .................. 719/318
7,296,194 B1 * 11/2007 Lovy et al. ................ 714/57
2004/0150647 A1  8/2004 Aleksic et al. ........... 345/555
2006/0007072 A1  1/2006 Choi et al. ................ 345/76
2006/0097975 A1  5/2006 Lee et al. .................. 345/98
2006/0230260 A1 * 10/2006 Szolyga et al. ............ 713/1

* cited by examiner

Primary Examiner—M Good Johnson
(74) Attorney, Agent, or Firm—Hamilton & Terrile, LLP; Robert W. Holland

(57) ABSTRACT

An activity poller on an external graphics box is activated during inactivity in communication from a host information handling system to the external graphics box, such as over an external PCI Express cable. The activity poller periodically sends a memory read request from the external graphics box to the host information handling system through the PCI Express cable and analyzes the response to determine the operational state of the host information handling system. Failure of the host information handling system to respond to the polling for a predetermined time results in presentation of a locally generated diagnostic message at the external graphics box, such as message stored in shader instructions of the external graphics box.

20 Claims, 2 Drawing Sheets

SYSTEM AND METHOD FOR INFORMATION HANDLING SYSTEM EXTERNAL GRAPHICS BOX LOCAL DIAGNOSTIC MESSAGE

BACKGROUND OF THE INVENTION

1. Field of the Invention

The present invention relates in general to the field of information handling system diagnostics, and more particularly to a system and method for information handling system external graphics box local diagnostic message.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with a number of peripherals to present, communicate, print or otherwise process information. For instance, information handling systems typically present information as visual images at an external display. Generally, visual information is generated at a central processing unit (CPU) and communicated through an internal bus, such as a PCI Express (PCIe) bus, to a graphics card. At the graphics card, a graphics processor unit (GPU) renders the visual information to define the color for presentation at each pixel of a display. The pixel-level information is then communicated from the graphics card through an external cable, such as a DVI or VGA cable, to an external display for presentation of visual images. Generally, a powerful GPU provides improved rendering of visual images by shifting processing of images from the CPU. For applications that rely on presentation of complex images, such as gaming or CAD applications, specialized components of a graphics card bear a substantial burden during the generation of visual images, thus freeing the CPU to perform other tasks. Relegating graphics processing to a graphics card GPU distributes tasks to allow for more efficient operation of an information handling system.

In some instances, the graphics processing capability desired for an information handling system places a substantial burden on the cooling and power budgets of the information handling system. For instance, a powerful graphics card can consume in excess of 150 Watts of power and produce a great amount of heat as a by product of the high power consumption. Although an information handling system chassis may be designed to manage such high power consumption and heat production, the expense of such a design is typically not justified by the relatively few number of systems purchased with such high graphics processing capability. As a compromise, information handling system manufacturers instead have shifted the graphics processing from the information handling system chassis to the display unit itself in an external graphics box architecture. For instance, a PCIe bus extends from an information handling system through an external cable to a graphics card of the external graphics box. The external graphics box has cooling and power subsystems that are independent of the information handling system so that powerful graphics processing capability is supported without burdening the information handling system cooling and power subsystems. One difficulty with the external graphics box architecture is that, if the host information handling system becomes disabled preventing communication across the PCIe cable link, the external graphics box will either freeze on the last displayed screen or go blank making it impossible for the end user to determine whether the host or the external graphics box is at fault.

SUMMARY OF THE INVENTION

Therefore a need has arisen for a system and method which monitors communication between an external graphics box and an information handling system to detect and analyze failures.

In accordance with the present invention, a system and method are provided which substantially reduce the disadvantages and problems associated with previous methods and systems for detecting and analyzing communication failures between an external graphics box and an information handling system. Activity from a host information handling system is analyzed to detect host failure. Upon detection of host failure, a diagnostics message is locally generated at the external graphics box and presented at a display to inform the user of the host failure.

More specifically, an information handling system communicates image information through an external PCIe cable to an external graphics box. The external graphics box processes the image information to render images for presentation at a display. An inactivity timer monitors communication across the PCIe bus and initiates an activity poller after a predetermined period of bus inactivity. The activity poller sends a request to the information handling system and determines a failure of the information handling system in the event of a failure by the system to respond to the request for a predetermined time. A diagnostics engine interfaced with the activity poller retrieves a diagnostics message from local memory, such as from shader instructions stored in ROM of the external graphics box, and presents the diagnostics message as an image. The diagnostics message is removed upon a reset of the external graphics box or the information handling system, such as with a PCIe hot reset.

The present invention provides a number of important technical advantages. One example of an important technical advantage is that a diagnostic message is automatically presented at an external graphics box if communication with a host information handling system fails. Periodic polling from the external graphics box to the host information handling system through the PCIe bus detects failures with minimal impact on display performance. Posting of diagnostic messages informs users if failures relate to a host difficulty versus a display difficulty, reducing the time needed for troubleshooting and the chances that the user will have to call the manufacturer for technical assistance. Reducing requests for technical assistance reduces manufacturer support costs and provides a more positive customer experience.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Local generation of a diagnostics message by an external graphics box alerts an end user if a host information handling system has failed with native processing capability of the external graphics box. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
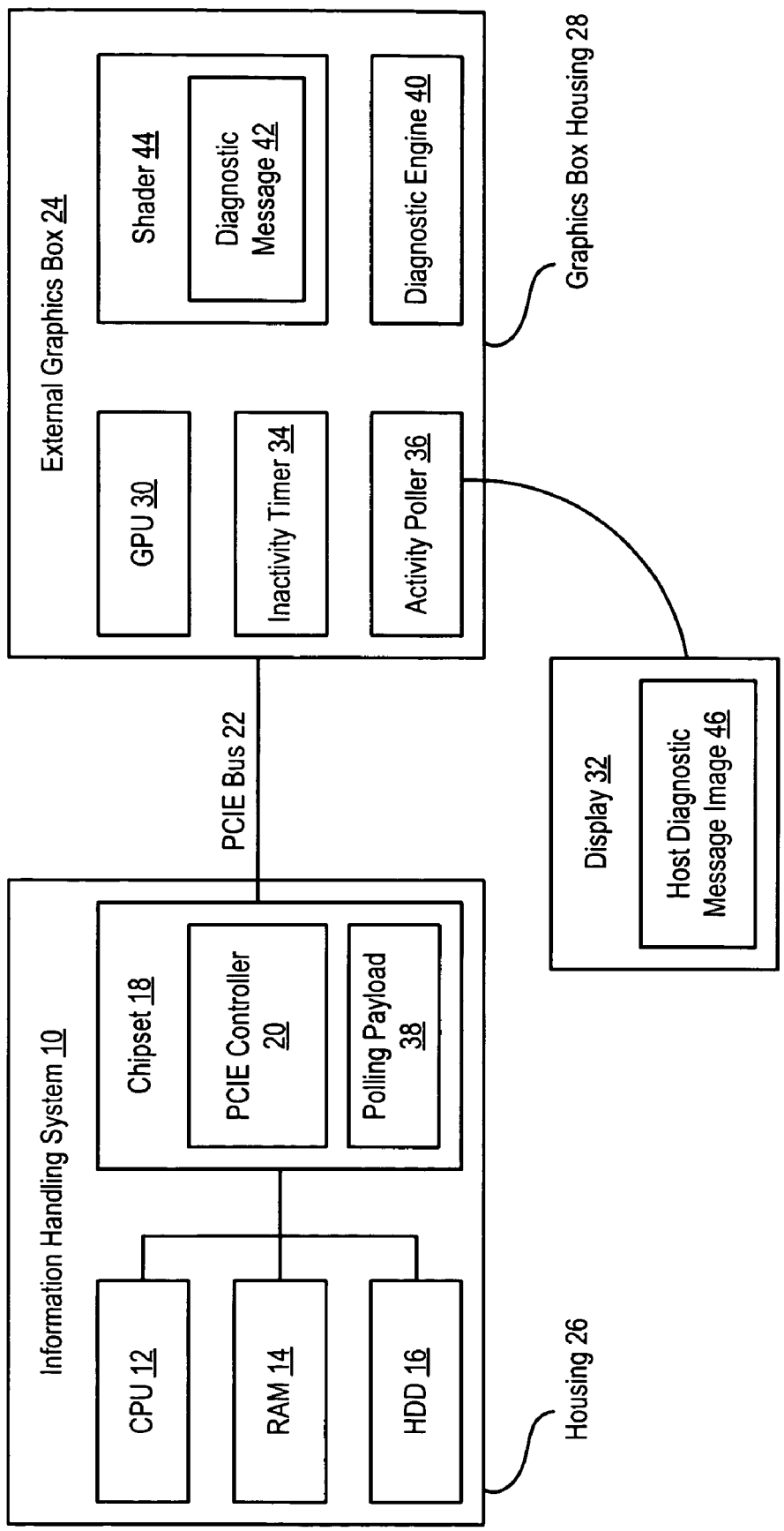
FIG. 1 depicts a block diagram of an information handling system external graphics box having locally generated diagnostic messaging.

Referring now to FIG. 1, a block diagram depicts an information handling system external graphics box having locally generated diagnostic messaging. Information handling system 10 has plural processing components that cooperate to generate image information, such as a CPU 12, RAM 14, a hard disk drive 16 and a chipset 18. The image information is communicated through a PCIe controller 20 and PCIe external bus cable 22 to an external graphics box 24. Information handling system 10 has the processing components disposed in a housing 26 that is separate and distal the graphics box housing 28 of external graphics box 24. The use of separate housings allows independent power and cooling subsystems for each housing so that the powerful graphics processing capability of external graphics box 24 will not place an excessive burden on the power and cooling subsystems of information handling system 10. A GPU 30 in external graphics box 24 processes image information to render images for presentation at a display 32.

At times during normal operating conditions, the image presented on display 32 remains constant or has only minimal changes so that the image is presented with little or no information communicated over PCIe bus 22. An inactivity timer 34 running on external graphics box 24, such as firmware instructions called and executed by GPU 30, monitors PICe bus 22 to detect periods of inactivity. For instance, inactivity timer 34 expires after a predetermined time but is reset at each detection of activity on PCIe bus 22. Once inactivity timer 34 detects a period of inactivity, it initiates an activity poller 36 to determine whether the detected inactivity is a legitimate idle state of the host information handling system 10 or indicative of a failure at host information handling system 10. Activity poller 36 attempts to determine the operational state of host information handling system 10 by sending a memory Read Request TLP to a valid host memory address, such as polling payload 38 in chipset 18, and checking for an expected completer response packet with an associated data payload. If the expected response is received from host information handling system 10 by activity poller 36, external graphics box 24 continues with normal operations.

If host information handling system 10 fails to respond to activity poller 36 in a predetermined period of time, then a difficulty has arisen with the host so that the image presented by display 32 may be inconsistent with that expected by the end user. However, viewing the presented image alone does not indicate to the end user whether host information handling system 10 or external graphics box 24 has failed. In order to present this information to the end user, a diagnostic engine 40 interfaced with activity poller 36 determines that a failure of host information handling system 10 to respond to polling indicates a failed host. Diagnostic engine 40 retrieves a diagnostic message 42 from ROM of external graphics box 24, such as a message embedded in a shader 44, and presents the diagnostic message as a host diagnostic message image 46 at display 32. Activity poller 36 and diagnostic engine 40 are, for instance, firmware instructions running on GPU 30 so that the diagnostic message is locally generated at external graphics box 24 independent of host information handling system 10. The diagnostic message is a prepared message or a code segment that, once run, presents a message to indicate that the host has failed to respond and suggest recovery steps, such as a reset of the host. To clear the diagnostic message, the end user may reset GPU 30 locally by a reset at external graphics box 24 or remotely by a reset of host information handling system 10 with a PCIe hot reset communicated over PCIe bus 22 by a TS1 with hot reset bit set.

Figure 2:
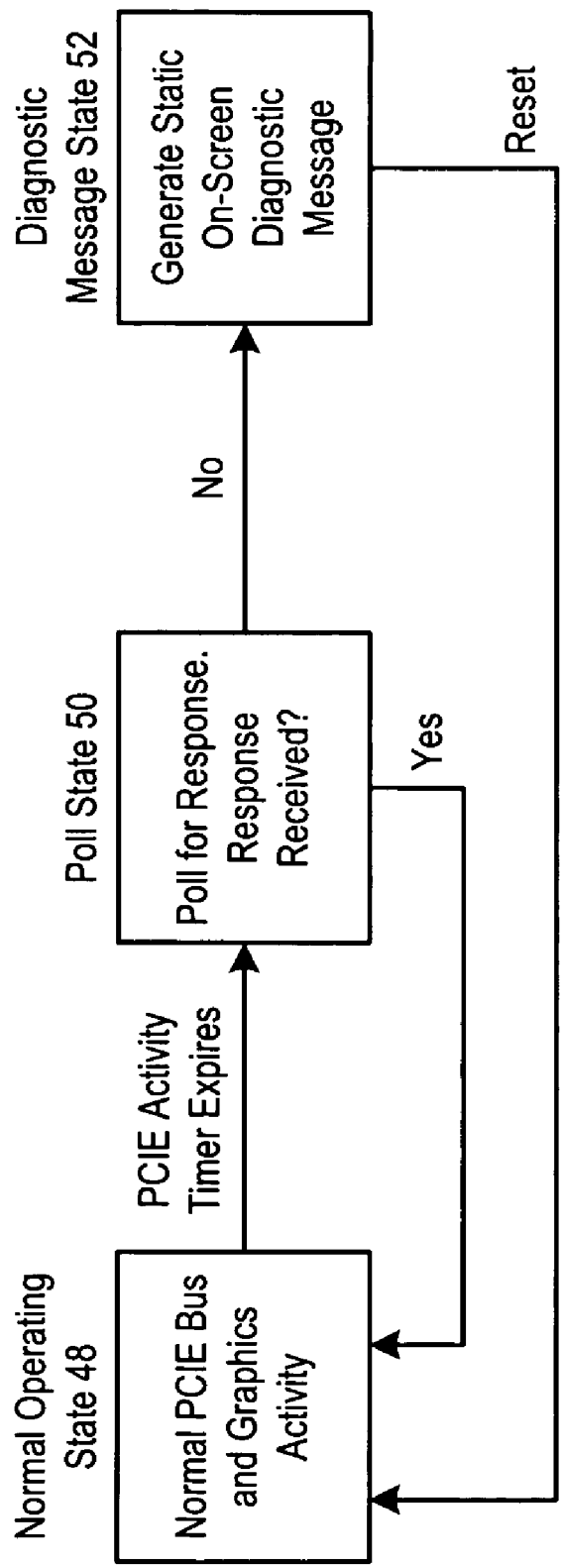
FIG. 2 depicts a state diagram of a system for locally generating diagnostic messages at an external graphics box.

Referring now to FIG. 2, a state diagram depicts a system for locally generating diagnostic messages at an external graphics box. The external graphics box transitions between three states in the process of monitoring and analyzing the operation of a host information handling system. In the normal operating state, the GPU of the external graphics box sends and receives packets across a PCIe link. If the PCIe link becomes inactive a timer starts and, if no activity occurs before the timer expires, the external graphics box transitions to a poll state 50. In poll state 50, the GPU of the external graphics box sends a memory Read Request TLP to a valid host memory address and expects a completer response packet with a predetermined payload. Poll state 50 addresses the situations where a legitimate reason exists for an inactive PCIe link, such as if nothing needs to be rendered in the graphics subsystem like when the screen is idle. If the expected response is received, the GPU transitions back to normal operating state 48. If the expected response is not received after a transaction completion timeout, the GPU transitions to a diagnostic message state 52. In the diagnostic message state, the GPU retains the current display mode and CRT controller state and fetches a segment of shader instructions contained in adapter ROM of the external graphics box. Execution of the shader instructions presents a diagnostic message at a display to inform the user that a host problem has been encountered, such as communication failure or host power down. A reset performed while in the diagnostic message state, either locally at the external graphics box or remotely through the PICe link, returns the external graphics box to the normal operating state.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   plural processing components disposed in the housing and operable to generate image information;
   a graphics box housing;
   graphics processing components disposed in the graphics box housing, the graphics processing components operable to render the image information into display information for presentation of an image at a display;
   a bus interfacing the processing components with the graphics processing components, the bus operable to communicate the image information from the housing to the graphics box housing; and
   an activity poller running on a graphics processing component, the activity poller operable to poll one or more of the processing components through the bus to determine the operational state of the processing components.

2. The information handling system of claim 1 further comprising:
   a diagnostics engine interfaced with the activity poller, the diagnostics engine operable to present a diagnostics message image associated with the determined operational state.

3. The information handling system of claim 1 further comprising:
   an inactivity timer interfaced with the activity poller and the bus, the inactivity timer operable to monitor the bus for a predetermined inactivity time and to initiate the activity poller after the predetermined inactivity time.

4. The information handling system of claim 1 wherein the bus comprises a PCI Express bus.

5. The information handling system of claim 1 wherein the activity poller polls a predetermined valid memory address and determines that the processing components are operable if information from the memory address is returned in response to the poll.

6. The information handling system of claim 1 wherein the graphics processing components comprise a shader, the shader storing a diagnostics message for presentation at a display if the activity poller determines the processing components are inoperable.

7. The information handling system of claim 1 further comprising a display interfaced with the graphics processing components and operable to present the image information.

8. A method for managing presentation of information at an external graphics box, the method comprising:
   detecting inactivity at a bus connecting a host information handling system and the external graphics box;
   polling the host information handling system from the external graphics box;
   analyzing the polling to determine the operational state of the host information handling system; and
   generating a diagnostic message at the external graphics box, the diagnostic message associated with the determined operational state.

9. The method of claim 8 wherein detecting inactivity further comprises:
   monitoring at the external graphics box the communication received from a host information handling system; and
   determining inactivity to initiate polling if the host information handling system fails to provide communication to the external graphics box for a predetermined time.

10. The method of claim 8 wherein polling further comprises:
    sending a memory read request from the external graphics box through the bus to a valid memory address of the host information handling system; and
    monitoring the bus for a predetermined time to determine if a response is received to the read request from the host information handling system.

11. The method of claim 10 wherein analyzing the polling further comprises determining the host information handling system is inoperative if the response to the read request is not received in the predetermined time.

12. The method of claim 8 wherein generating a diagnostic message further comprises retrieving a prepared diagnostic message from ROM of the external graphics box and presenting the prepared diagnostic message at a display associated with the external graphics box.

13. The method of claim 12 wherein the prepared diagnostic message is stored in a shader of the external graphics box.

14. The method of claim 8 further comprising resetting the external graphics box to remove the diagnostic message.

15. The method of claim 8 wherein the bus comprises a PCI Express bus, the method further comprising removing the diagnostic message by communicating a PCI Express hot reset from the host information handling system.

16. A system for local generation of a diagnostic message at an external graphics box, the system comprising:
    an activity poller running on the external graphics box and operable to send a request to a host information handling system and detect a failure of the host information handling system to respond to the request;
    a diagnostic engine interfaced with the activity poller, the diagnostic engine operable to retrieve a diagnostic message for presentation at a display if the host information handling system fails to respond to the request; and
    a diagnostic message stored on the external graphics box and retrievable by the diagnostic engine.

17. The system of claim 16 further comprising an inactivity timer operable to detect a predetermined inactivity associated with the host information handling system and to initiate the activity poller upon detection of the predetermined inactivity.

18. The system of claim 16 further comprising a shader loaded in the external graphics box, the diagnostic message stored in the shader.

19. The system of claim 16 wherein the activity poller request comprises a memory Read Request TLP to a valid memory address of the host information handling system and the host information handling system responds with a completer response packet having a predetermined data payload.

20. The system of claim 16 further comprising a PCI Express bus connecting the external graphics box to the host information handling system, the PCI Express bus operable to reset the diagnostics message with a PCI Express hot reset.

* * * * *